Sept. 8, 1953  E. P. WORTHEN ET AL  2,651,415
OIL SEPARATOR

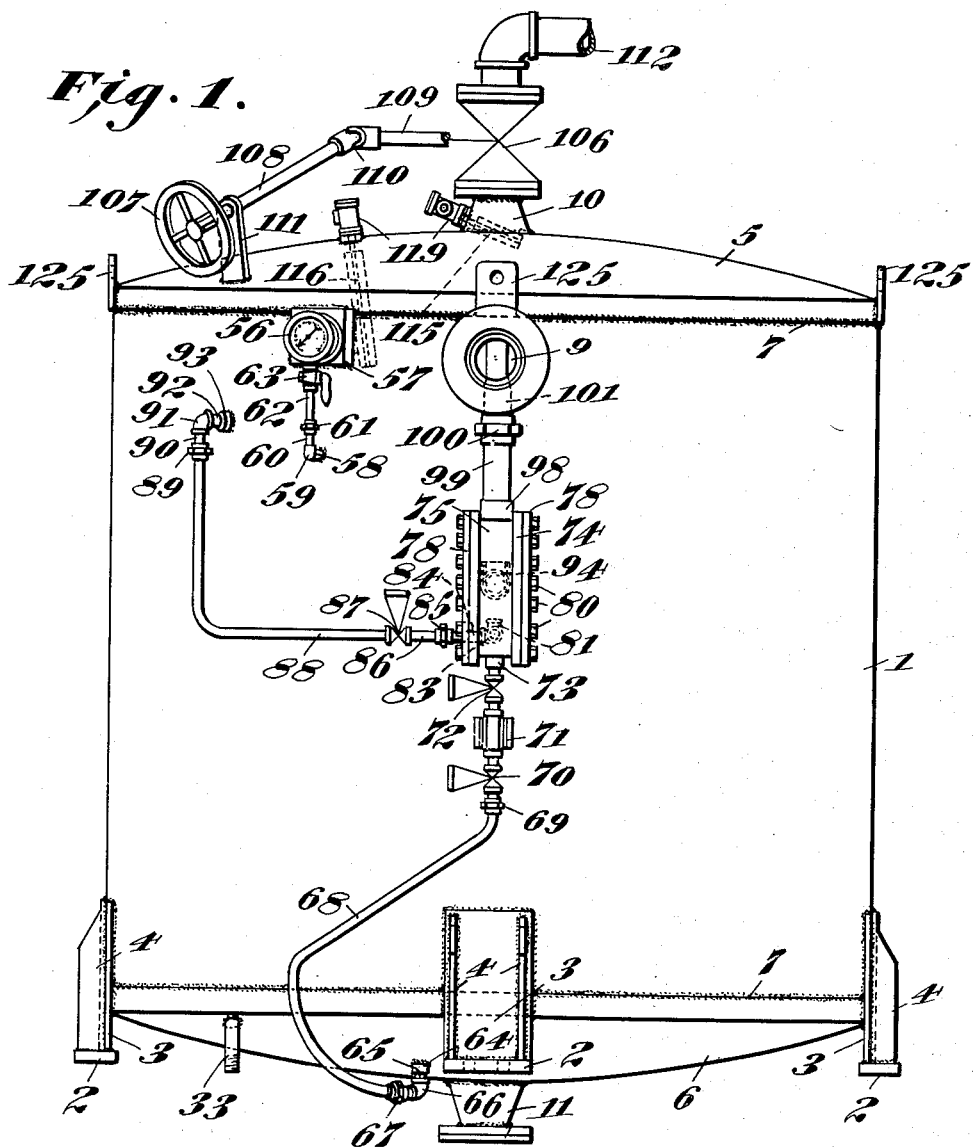

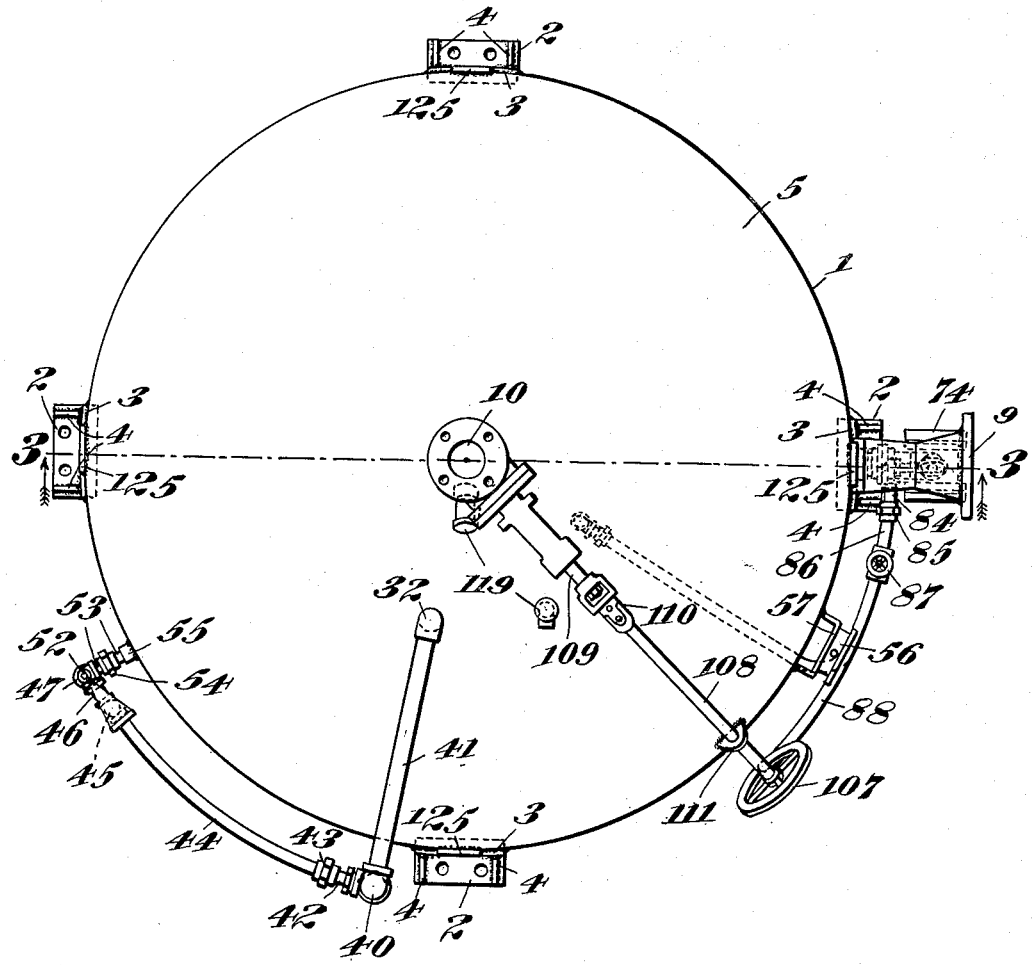

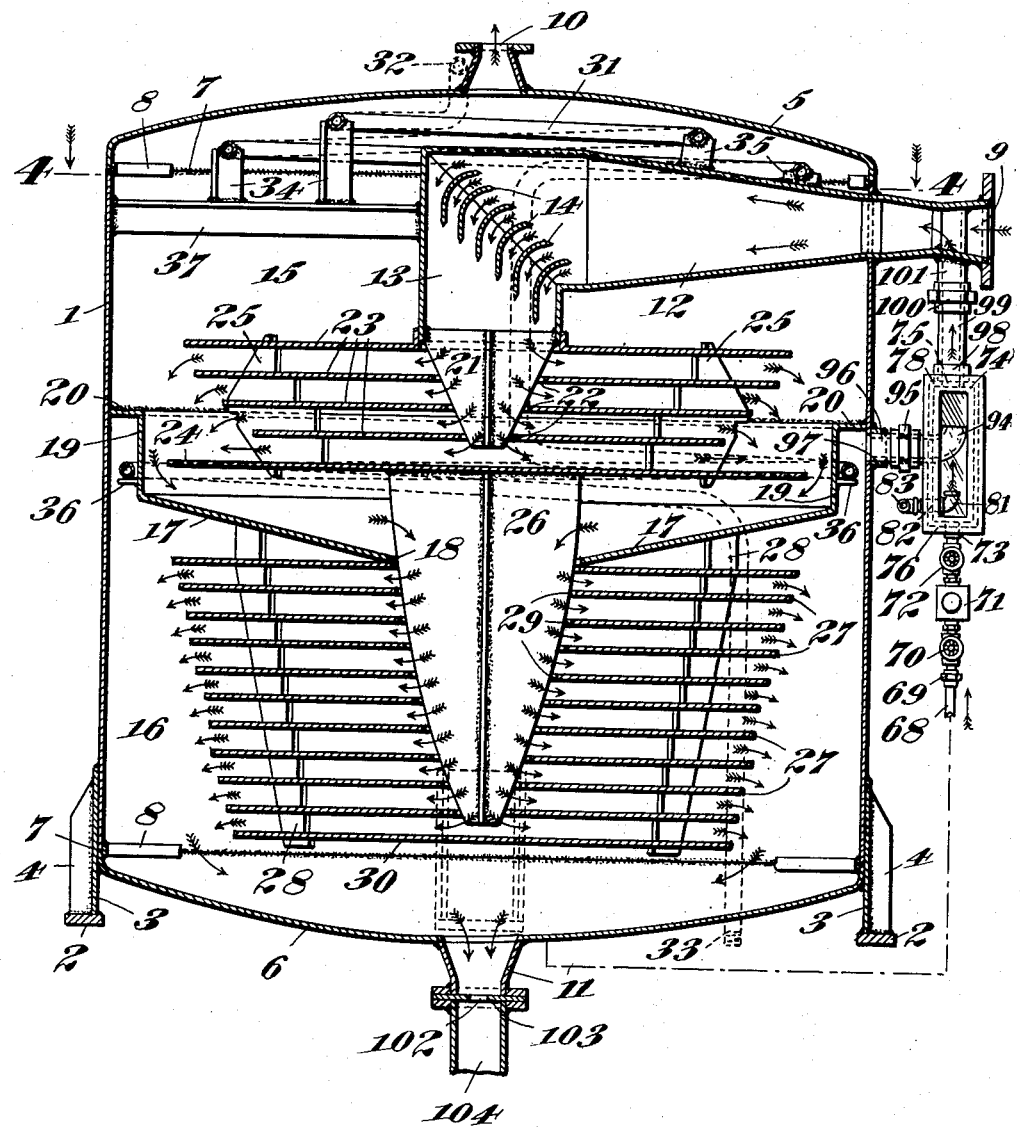

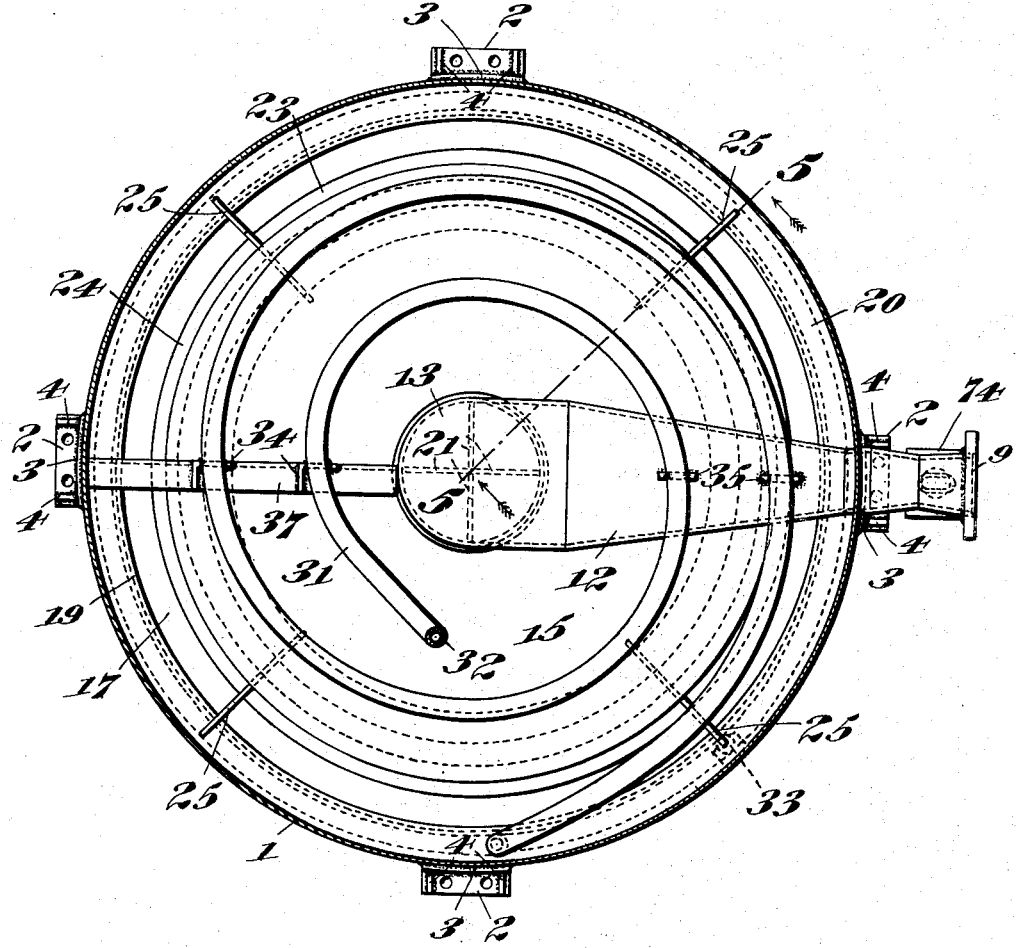

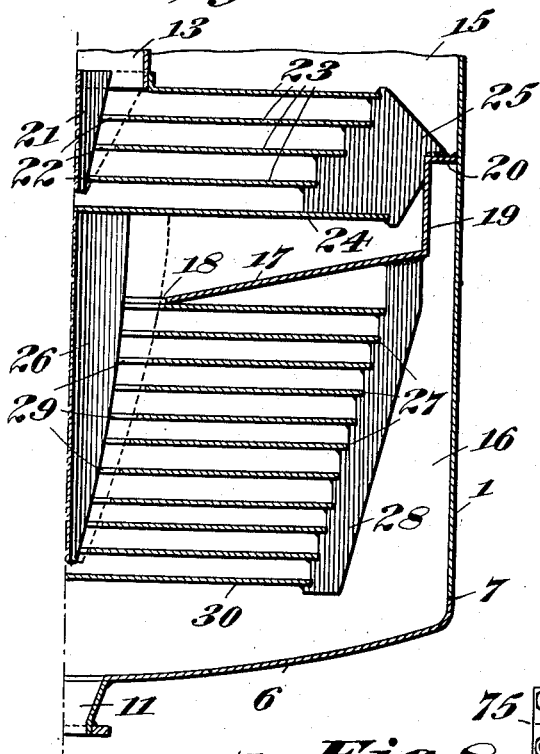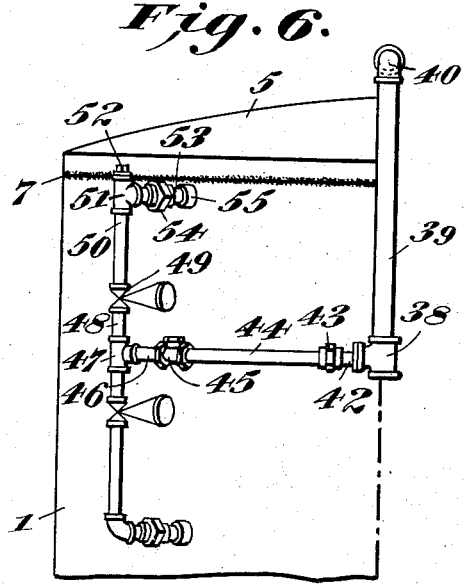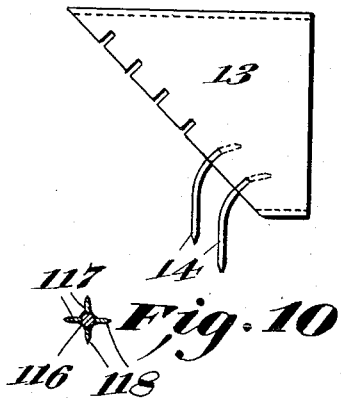

Filed May 1, 1947  6 Sheets-Sheet 6

Inventors
Eugene Porter Worthen
and Charles S. L. Robinson.
By R. S. A. Dougherty.
Attorney Patented Sept. 8, 1953

2,651,415

UNITED STATES PATENT OFFICE 2,651,415

OIL SEPARATOR

Eugene Porter Worthen, Braintree, and Charles S. L. Robinson, West Newton, Mass., assignors to Bethlehem Steel Company, a corporation of Pennsylvania Application May 1, 1947, Serial No. 745,270

8 Claims. (Cl. 210—51)

This invention relates in general to an apparatus for separating the oil from oil-contaminated waters, and more particularly to an apparatus of this nature which is especially adapted for marine and industrial purposes.

Bilge and ballast oil separators are installed on vessels to handle oily bilge and ballast water when it is being pumped overboard. This service differs from other separator applications in that large quantities of oily water must be handled at a high flow rate, on the order of 50 or 100 tons per hour.

The usual object of such separators is to prevent oil from polluting restricted waters and to save it for burning under the ship's boilers. The oil in the overboard water is usually not allowed to exceed 0.05%. Since this percentage depends on the oil content of the water to the separator and the rate at which it flows, the ratings are arbitrariliy based on 3% oil in the incoming water.

The present invention is also well suited for industrial applications where unemulsified oil must be removed from large water flows.

A principal object of this invention is to provide a separator which will allow a maximum amount of time for separation, while minimizing the distance through which an oil particle must rise.

Another object is a separator which will permit a continuous inlet flow of the mixture at low velocity and without excessive turbulence.

Another object is a separator which operates in a plurality of stages with increased separating capacity.

Another object is a separator in which second stage oil flow is returned to first stage inlet.

Another object is a sight glass arrangement for indicating location of oil level in first stage and clarity of overboard discharge water.

Still another object is an electrically operated oil outlet valve which automatically maintains first stage oil level within proper limits.

Other and further objects, purposes and advantages of this invention will be apparent from the following description, wherein reference is made to the accompanying drawings illustrating the preferred form of the invention and wherein like reference numerals designate like parts.

In the drawings:

Figure 1 is a front elevation of the bilge and ballast oil separator comprising this invention;

Fig. 2 is a top plan view of said separator;

Fig. 3 is a vertical transverse section taken on the line 3—3 of Fig. 2;

Fig. 4 is a horizontal section substantially on the line 4—4 of Fig. 3;

Fig. 5 is a partial vertical section showing in detail the baffle plate supporting brackets;

Fig. 6 is a partial rear elevation showing the washing soda and steaming-out connections;

Fig. 7 is a detail view of the elbow and turning vanes attached to the diffuser cone to reduce the turbulence of the inflow;

Fig. 8 is a detail view of the sight glass for indicating oil levels and clarity of discharge;

Fig. 9 is a sectional detail taken on the line 9—9 of Fig. 8;

Fig. 10 is a section of one of the electrical control probes, taken on the line 10—10 of Fig. 11;

Fig. 11 is a side elevation, partially in section, of said electrical control probe.

Figure 12:
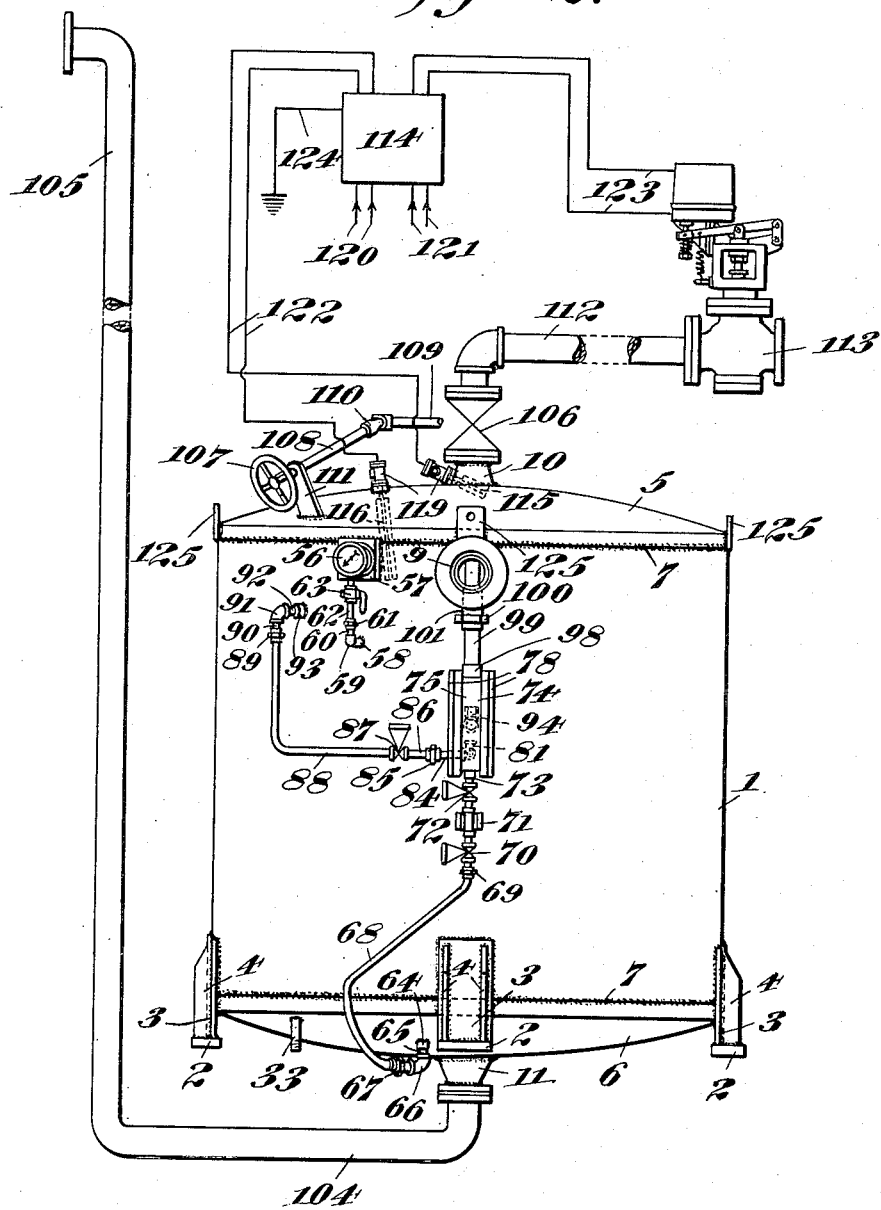
Fig. 12 is a front elevation of the separator showing the electrical controls of the oil outlet valve.

Referring to Fig. 1 of the drawings, the separator externally comprises a cylindrical metal shell or casing 1, mounted in upright position on welded base and vertical support plates 2 and 3 strengthened by stiffeners 4, and provided at top and bottom with heads 5 and 6 of shallow dish type, their welded junctures 7 to the shell 1 being covered by backing strips 8. Oily water inlet 9 is located at one side near the top head 5, separated oil outlet 10 is located centrally in said top head 5, and clean water outlet 11 is located centrally in the bottom head 6.

The internal arrangements, as shown in Figs. 3 and 4, include a horizontal diffuser cone 12, expanding gradually from inlet 9 to full diameter at the downwardly projecting central elbow 13 provided with a plurality of parallel spaced curved inner baffles or vanes 14. Beneath the cone 12 and elbow 13 the shell 1 is divided into first-stage and second-stage separating compartments 15 and 16 by a frusto-conical baffle plate 17 having a central aperture 18 and upright side rim 19 spaced from the shell 1, to which the top rim 20 of said frusto-conical baffle plates 16 is welded or otherwise secured.

In said first stage compartment 15, suspended at the bottom opening of the elbow 13 is a downwardly tapering decussate flow splitter 21, projecting downwardly through central apertures 22 in a pluarity of horizontal parallel circular baffle plates 23. The outer edge of the uppermost of said baffle plates 23 is inwardly spaced a short distance from shell 1, and the successively lower plates are spaced at increasing distances from said shell and the side rim 19. The outer edge of the bottom plate 24 of this group of plates, however, again approaches closer to the side rim 19. All these plates are held in uniformly spaced relation by step-shaped supporting brackets 25, welded to each plate and to the top rim 20 as shown in Fig. 5.

The second stage compartment 16 has a similar, but larger, tapered decussate flow splitter 26 suspended from the bottom baffle plate 24 of the first stage, and a larger number of horizontal evenly spaced circular baffle plates 27 of downwardly decreasing diameters, suspended from the frusto-conical baffle plate 17 by the stepped brackets 28, the flow splitter 26 passing through central apertures 29 in all but the bottom plate 30.

Referring to Figs. 3 and 5, it will be noted that the inner apertures 22 and the outer diameters of the circular baffle plates 23 successively decrease in size downwardly in each compartment. One purpose of this is to maintain a low and substantially uniform velocity of flow within such compartment, since the quantity of inlet flow moving centrally downward is diminished at each separating layer by the amount of flow passing outward through that layer, and the flow quantity at the outer edge of each layer is correspondingly increased.

A steam coil 31 having an upper inlet elbow 32 and lower outlet connection 33 is preferably mounted within the shell 1 on suitable supports 34, 35 and 36, secured upon the angle 37, cone 12, and side rim 19, as shown in Figs. 3 and 4, in order to heat the oil and thereby decrease its viscosity.

Referring now to Figs. 2 and 6, the T 38 serves as an inlet for steam to flow upward through the pipe 39, elbow 40 and pipe 41 to the upper inlet elbow 32 of the steam coil. Said T 38 is also connected in nipple 42, which in turn connects to female union 43, pipe 44, check valve 45, pipe 46, and T 47. The T 47 is upwardly connected to the pipe 48, gate valve 49, pipe 50, and T 51. Pipe plug 52 in the upper branch of the T 51 is removable to permit additions of washing soda during clean-out periods. The other branch of the T 51 is connected by the short nipples 53, joined by union 54, to the half coupling 55, thereby admitting steam and washing soda for the purpose of cleaning the interior of the separator.

A pressure gauge 56, having for example 0–60 pounds scale, is mounted on bracket 57 and connected to the first stage compartment 15 by the half-coupling 58, street elbow 59, nipple 60, union 61, nipple 62 and cock 63.

Sight glass connections are shown in Figs. 1, 3 and 12, and include the half coupling 64 on the bottom head 6, the short nipple 65, elbow 66, union 67, pipe 68, union 69, and gate valve 70 connected to the small sight glass 71, which in turn is connected to gate valve 72 and thence to the lower inlet half-coupling 73 at the bottom of the large sight glass 74.

Referring more particularly to Figs. 8 and 9, the large sight glass 74 comprises an oblong, rectangular, vertically disposed metal casing 75, opposite side plates of which are cut away and provided with recessed edges to admit transparent hard glass cover plates 76 which are made watertight by gaskets 77 and secured in place by recessed rectangular frames 78 fastened to the casing 75 by studs 79 and nuts 80. A second inlet thereto is provided by the small street elbow 81 and coupling 82, connecting by means of 90° elbow 83, short nipple 84, union 85, pipe 86, gate valve 87, pipe 88, union 89, short nipple 90, 90° elbow 91, short nipple 92, and half-coupling 93 to the lowest desirable oil level in the first stage compartment 15.

The third or upper inlet connection to the sight glass 74, disposed about midway of its height, comprises the short radius elbow 94, connected as shown in Fig. 3 by the union 95, nipple 96 and half-coupling 97 to the top portion of the second stage compartment 16, just below the top rim 20 of the frusto-conical baffle plate 17. The outlet connection of the sight glass 74 is the half-coupling 98, connected by pipe 99 and union 100 to pipe 101 entering into the first stage inlet 9, wherein the upper portion of said pipe 101 is left open rearwardly to permit the reentry into the separator of flow from the sight glasses.

The flow of outlet water, through the orifice 102 in plate 103 into the discharge pipe 104 and pressure loop 105, is continuous and requires no regulation. The flow of outlet oil may be regulated manually, by the globe valve 106 operated by the hand wheel 107 and extension rods 108 and 109 connected by universal joint 110 and supported on bracket 111, or automatically through the discharge pipe 112 and solenoid valve 113, operated by conventional electrical relay 114 and insulated upper and lower probes or electrodes 115 and 116, provided with longitudinal fins 117 having sharp edges 118, as shown in Figs. 10 and 11, and mounted in suitably insulated electrode holders 119 on the upper head 5.

The relay 114 may be of any suitable commercial electromagnetic or electronic type. Either type may be used successfully, the electronic type being generally more sensitive and easily adjusted but also more expensive than the electromagnetic type. The relay is provided with power supply lines 120 and 121 for actuating the relay and solenoid valve respectively, with leads 122 and 123 to the probes and solenoid valve respectively, and with the lead 124 grounded to the separator shell.

To assist in handling with a crane or the like, as during installation or repairs, lifting lugs 125 are securely welded to the upper head 5 of the separator.

In operation, the very efficient separating action of this apparatus is based on the difference in density between the oil and the water. Typically, the oil may be a heavy fuel oil with a specific gravity of 0.98 and the water may be sea water with a specific gravity of 1.03. The separating force is gravity. The speed at which an oil particle rises depends also upon particle shape, water viscosity, and particle size. These are related by well known physical laws, so the separating velocity may be calculated for any given case. Smaller particles rise more slowly than larger ones, so the capacity of a separator varies with the minimum dispersed particle size to be removed.

Accordingly, the oil and water mixture to be separated enters the inlet 9 and flows through the long horizontal diffusing cone 12, thus causing a large reduction of velocity, on the order of 6:1 from the initial velocity, without turbulence because of the gradual expansion of the cone. The mixture is then directed downward by the elbow 13 to enter the separating spaces or layers between the baffle plates 23 of the first stage compartment 15. The parallel curved baffles or vanes 14 cause all the fluid to make the turn at approximately the same radius of curvature, and thereby prevent secondary centrifugal currents which could later harm the separating action.

The flow enters the separating layers at the center and flows radially outward. In these layers, the velocity becomes very low toward the outer periphery and the oil is given considerable time to rise to the top. It is only necessary for it to rise to the upper plate of a given layer, because there it will adhere to that surface and join with other particles.

At the outer periphery the very low water velocity will sweep off only large globules of oil. These will rise rapidly across the water streams because the speed with which oil particles rise increases as the square of their diameters. If the oil quantities are very large, then they make continuous streams of oil channeling through the water. Thus no pipes or conduits for the oil are necessary within the separator. In a certain sense the multiple layers are used only to cause small particles to join and form larger ones.

The water from the first stage 15 flows downward and then horizontally to the center at the top of the second stage 16. The separating action of said second stage 16 is essentially the same as that of the first stage 15. However, the second stage 16 is larger than the first stage 15, having ten (10) separating layers as compared to four (4). Velocities are reduced in the same proportion, and thus more of the smaller oil particles are removed. Under ordinary conditions, these smaller particles are not a large fraction of the total volume of entering oil, but they must be removed for the outlet water to be clean, and accordingly they are joined together in large particles and returned through large elbow 94, sight glass 74, and pipes 99 and 101 to the first stage inlet 9.

The outlet water flows continuously from the bottom orifice 102 and piping loop 105, which loop is sufficiently high to main a moderate pressure in the shell. This pressure will force oil out of the top outlet 10 of the unit when the oil valves 106 and 113 are opened.

The automatic regulation of the outlet valve 113 depends upon the fact that water is a conductor of electricity whereas all oils are fairly good insulators. When water touches the upper probe 115 current flows from it to the separator shell. Although this current may be less than one milliampere, it is sufficient to cause the relay 114 to close the solenoid valve 113. The valve remains closed until oil insulates not only the upper probe 115 but also the lower probe 116. Then when current ceases to flow through the lower probe 116, the relay 114 reopens the solenoid valve 113. The fins 117 and sharp edges 118 cut through adhering oil films which would tend to insulate the probes even when immersed in water.

The use of sight glasses 71 and 74 to observe the operation is based on the principle that as their inside surfaces are already immersed in water and wetted by it, oil globules will not adhere to them or obscure the glasses.

A sample of flow from the bottom of the separator, which represents the outflow, is drawn up through the small sight glass 71, where it can be carefully observed, and thence into the larger sight glass 74. This water is relatively free from oil, hence it aids in keeping the larger glass transparent.

There are two other flows into the larger sight glass 74. The smaller one is a sample from the lowest desirable oil level in the first stage. When large oil globules appear at its exit, the oil outlet valves should be opened. The larger flow into the upper sight glass is oil collected off the second stage. All these flows are returned to the first stage inlet 9.

Although we have thus described our invention hereinabove in considerable detail, we do not wish to be limited narrowly to the exact particulars disclosed, or to the specific liquids treated, but may use such substitutes, modifications, or equivalents thereof as are included within the scope of the invention or pointed out in the appended claims.

We claim:

1. A separating device for oil and water mixtures, comprising an enclosing shell, a funnel shaped baffle dividing the shell into upper and lower oil-collecting chambers, an oily water inlet and a separate oil outlet connecting to the upper chamber, a water outlet connecting to the lower chamber, and conduit means for recycling oil collected in the upper part of the lower chamber to the upper chamber inlet.

2. A separating device for oil and water mixture, comprising a shell having an oily water inlet and a separate oil outlet at the top and a water outlet at the bottom thereof, a centrally inclined baffle dividing the shell into upper and lower oil-collecting chambers, and external conduit means for returning oil recovered in the lower chamber to the upper chamber for discharge therefrom.

3. A separating device for oil and water mixtures, comprising a shell divided by a transverse funnel-shaped baffle into first and second stage compartments, a mixture inlet adjacent the top of the shell and separate oil and water outlets at the top and bottom of the shell respectively, and sight glasses communicating with an area near the water outlet and with the middle portion of the first stage and the upper portion of the second stage compartments, said second stage sight glass serving also to discharge collected oil from the second stage to the first stage.

4. A separating device for oil and water mixtures, comprising an upright cylindrical shell having top and bottom heads, a frusto-conical baffle plate provided with a central aperture and dividing the shell into upper and lower compartments, diffusing inlet means for admitting oily water into the upper compartment, a plurality of parallel baffle plates provided with central apertures of downwardly decreasing diameters in each compartment, means for segmenting the inflow into each compartment, a separated oil outlet in the upper compartment, and a cleansed water outlet in the lower compartment.

5. A separating device for oil and water mixtures, comprising an upright cylindrical shell having top and bottom heads, a frusto-conical baffle plate provided with a central aperture and dividing the shell into upper and lower compartments, an oily water inlet located at one side of the upper compartment near the top head, a horizontal diffuser cone connected to said inlet, a downwardly projecting elbow connected to said diffuser cone, a plurality of spaced curved vanes within said elbow, a plurality of horizontal parallel circular baffle plates suspended centrally in each compartment, a flow splitter in each compartment disposed centrally of the baffle plates, the flow splitter in the lower compartment depending from the upper compartment through the central aperture of the frusto-conical baffle plate, a separated oil outlet located centrally of the top head, and a clean water outlet located centrally of the bottom head.

6. A separating device for oil and water mixtures, comprising an upright cylindrical shell, a diaphragm dividing said shell into upper and lower communicating compartments, an oily water inlet and a separate oil outlet connecting to the upper compartment, a water outlet connecting to the lower compartment, a series of substantially flat horizontal circular baffle plates of downwardly decreasing inner and outer diameters spaced from the shell in each compartment, and means including a downwardly tapering baffle for distributing the flow radially between the baffle plates in each compartment.

7. A separating device for oil and water mixtures, comprising an upright cylindrical shell, a diaphragm dividing said shell into upper and lower communicating compartments, an oily water inlet and a separate oil outlet connecting to the upper compartment, a water outlet connecting to the lower compartment, a series of annular baffle plates of downwardly decreasing diameters spaced from the shell in each compartment, and a conduit connecting the upper portion of the lower compartment with the inlet of the upper compartment.

8. A separating device for oil and water mixtures, comprising an upright cylindrical shell, an oily water inlet and a separate oil outlet connecting to the upper portion of the shell, a water outlet connecting to the lower portion of the shell, a plurality of substantially flat annular baffle plates of downwardly decreasing inner and outer diameters mounted within the shell in spaced relation thereto, and means including a downwardly tapering baffle for distributing the flow radially between the baffle plates.

EUGENE PORTER WORTHEN.
CHARLES S. L. ROBINSON.

References Cited in the file of this patent

UNITED STATES PATENTS

| Number | Name | Date |
|---|---|---|
| 1,134,419 | Rensink | Apr. 6, 1915 |
| 1,320,340 | Overlin | Oct. 28, 1919 |
| 1,516,132 | Allen et al. | Nov. 18, 1924 |
| 1,613,507 | Feely | Jan. 4, 1927 |
| 1,698,002 | Pink | Jan. 8, 1929 |
| 1,943,367 | Champion | Jan. 16, 1934 |
| 1,958,010 | Meurk | May 8, 1934 |
| 2,025,883 | Mobley | Dec. 31, 1935 |
| 2,104,050 | Nibecker et al. | Jan. 4, 1938 |
| 2,119,348 | Parsons | May 31, 1938 |
| 2,232,709 | Luetgert | Feb. 25, 1941 |
| 2,294,697 | Seip | Sept. 1, 1942 |

FOREIGN PATENTS

| Number | Country | Date |
|---|---|---|
| 218,462 | Great Britain | July 10, 1924 |
| 473,108 | Great Britain | Oct. 6, 1937 |